US012639997B2

(12) United States Patent
Hart

(10) Patent No.: US 12,639,997 B2
(45) Date of Patent: **\*May 26, 2026**

(54) RFID CREDENTIAL DOOR READER WITH OPTICAL CAMERA SENSORS AND WIFI IN LOW POWER CONDITIONS

(71) Applicant: Jason Dean Hart, Fremont, CA (US)

(72) Inventor: Jason Dean Hart, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/982,881

(22) Filed: Dec. 16, 2024

(65) Prior Publication Data

US 2025/0201044 A1    Jun. 19, 2025

Related U.S. Application Data

(60) Provisional application No. 63/610,956, filed on Dec. 15, 2023.

(51) Int. Cl.
| | |
|---|---|
| *G07C 9/22* | (2020.01) |
| *G01S 17/50* | (2006.01) |
| *G01S 17/88* | (2006.01) |
| *G06K 7/10* | (2006.01) |
| *G07C 9/28* | (2020.01) |
| *G07C 9/29* | (2020.01) |

(52) U.S. Cl.
CPC ................ *G07C 9/22* (2020.01); *G01S 17/50* (2013.01); *G01S 17/88* (2013.01); *G06K 7/10297* (2013.01); *G07C 9/28* (2020.01); *G07C 9/29* (2020.01)

(58) Field of Classification Search
CPC .... G07C 9/22; G07C 9/28; G07C 9/29; G01S 17/50

USPC .......................................................... 235/451
See application file for complete search history.

(56) References Cited

U.S. PATENT DOCUMENTS

| | | | |
|---|---|---|---|
| 2007/0043954 A1 | 2/2007 | Fox | |
| 2007/0290793 A1 | 12/2007 | Tran | |
| 2017/0298653 A1 | 10/2017 | Corwin, Jr. et al. | |
| 2020/0312065 A1 | 10/2020 | Wendling et al. | |
| 2021/0125441 A1 | 4/2021 | Ufekes et al. | |
| 2021/0388640 A1 | 12/2021 | Gell | |
| 2025/0193666 A1 * | 6/2025 | Hart ...................... H04W 12/63 |

* cited by examiner

*Primary Examiner* — Ahshik Kim

(57) ABSTRACT

The present invention is a low power replacement sensor device for legacy RFID door readers comprising an omnidirectional BLE radio antenna; a unidirectional BLE radio antenna; a forward-facing LiDAR sensor; support for reading legacy RFID technology, newer advanced RFID technology, and other mobile credentials; and the use of low voltage legacy access control power systems. The preferred embodiment of the present invention further comprises an optical camera and a radar. In the preferred embodiment of the present invention, said sensor device can utilize commonly found legacy wiring for power combined with WiFi signaling for high speed data transfer. The present invention teaches a method of combining different sensors and radio antennas to address the unpredictable state of transmission characteristics of a mobile handset's BLE radio to accurately determine a person's intention to authenticate to a door or computer merely by their physical action of approaching a door or computer.

19 Claims, 10 Drawing Sheets

Approx. Height

RFID CREDENTIAL DOOR READER WITH OPTICAL CAMERA SENSORS AND WIFI IN LOW POWER CONDITIONS

FIELD OF THE INVENTION

The present invention relates generally to Radio Frequency Identification (RFID) technology, RFID door readers, and Bluetooth Low Energy (BLE) sensor devices. Particularly, the present invention is a low power replacement sensor device for legacy RFID door readers comprising an omnidirectional BLE radio antenna; a unidirectional BLE radio antenna; a forward-facing LiDAR sensor; support for reading legacy RFID technology, newer advanced RFID technology, and other mobile credentials; and the use of low voltage legacy access control power systems. The preferred embodiment of the present invention further comprises an optical camera and a radar.

BACKGROUND OF THE INVENTION

The processing power of an RFID door reader to determine the identity of a person from an optical sensor can be power intensive. To determine identity of a person, a processor must compute many image frames per second and apply computer vision models to those frames. IoT Sensor devices must leverage low energy power management systems to ensure operation at or below the industry specification of 12V and much less than 250 mA. Most devices that use a camera either operate from a battery or require the installation of new ethernet cabling. Most organizations have deployed RFID door readers that have either a proprietary cabling system known as Wiegand or another popular cabling system known as OSDP. In both cases, voltage is supplied at 12V or 24V and a maximum of 250 mA. Most RFID door readers use between 70 mA and 200 mA. This leaves little room for the inclusion of additional features such as LiDAR or optical cameras.

An objective of the present invention is to provide a low power RFID access control mechanism that can determine the identity of a person seeking access. In addition to using a physical credential, e.g. phone, card, fob, etc., the present invention uses optical and 3D computer vision to determine identity and verify access.

Another objective of the present invention is to provide a device that is energy efficient and able to reduce long-term power consumption. RFID door readers produce a magnetic inductive field which is used to energize and/or couple with another RFID device for communication. This magnetic field pulses on and off constantly, wasting energy while actively looking for an RFID credential. This inefficiency creates problems for battery-operated devices and other devices without an excess supply of power. Other devices have attempted to use inductive wakeup or capacitance wakeup as means to turn on the RFID field when a card or object is placed near the device. However, these approaches have various implementation problems especially with compatibility with NFC and detrimental environmental conditions.

The present invention combines the use of Bluetooth Low Energy (BLE) with LiDAR which operate at much lower power levels to receive an input about the presence of a person or mobile device. The present invention advantageously uses low energy LiDAR to pulse at periodic intervals to determine if any object has moved within a configurable distance of the sensor device, up to 8 m. This small pulse of photons requires little energy. Because of the device's long detection range, the pulsing interval can be as infrequent as once per second. When an object is detected within range, the sampling by the device's computer vision system is increased to determine direction. If a person is moving towards the sensor device and reaches less than a configurable distance, e.g. 3 ft, the RFID magnetic field can be fully powered until the person is no longer present. If the invention's input power is less than required to operate the computer vision processing system, the present invention may advantageously reduce the functionality of the optical camera and transfer the computer vision imaging to an external system, such as a cloud host computer for processing.

Another objective of the present invention is to provide a device that can be installed without the need to replace the legacy wiring infrastructure itself. The device is able to operate using low power legacy wiring infrastructure because the present invention advantageously maintains a low power of operation by not using its optical sensor or computing vision at all times. The present invention therefore allows more users to utilize the benefits of sophisticated RFID technology without incurring the cost of replacing commonly installed wiring infrastructure. WiFi communication can be used complementarily for high speed data transfer.

SUMMARY OF THE INVENTION

The present invention is a low power replacement sensor device for legacy RFID door readers comprising an omnidirectional BLE radio antenna; a unidirectional BLE radio antenna; a forward-facing LiDAR sensor; support for reading legacy RFID technology, newer advanced RFID technology, and other mobile credentials; and the use of low voltage legacy access control power systems. The preferred embodiment of the present invention further comprises an optical camera and a radar.

The present invention operates much less than 12/250 mA while maintaining current functionalities, optical services, and high speed data communication services. The device uses legacy power cables, communication wires, and a WiFi 5.8 GHz communication interface. By replacing older commonly-used legacy RFID readers and using power from the Access Control legacy wiring, the present invention can be installed without replacing the legacy wiring infrastructure itself. While using the legacy wiring for power, the present invention further utilizes the WiFi communication interface for high speed data transfer.

DETAILED DESCRIPTION OF THE INVENTION

Figure 1:
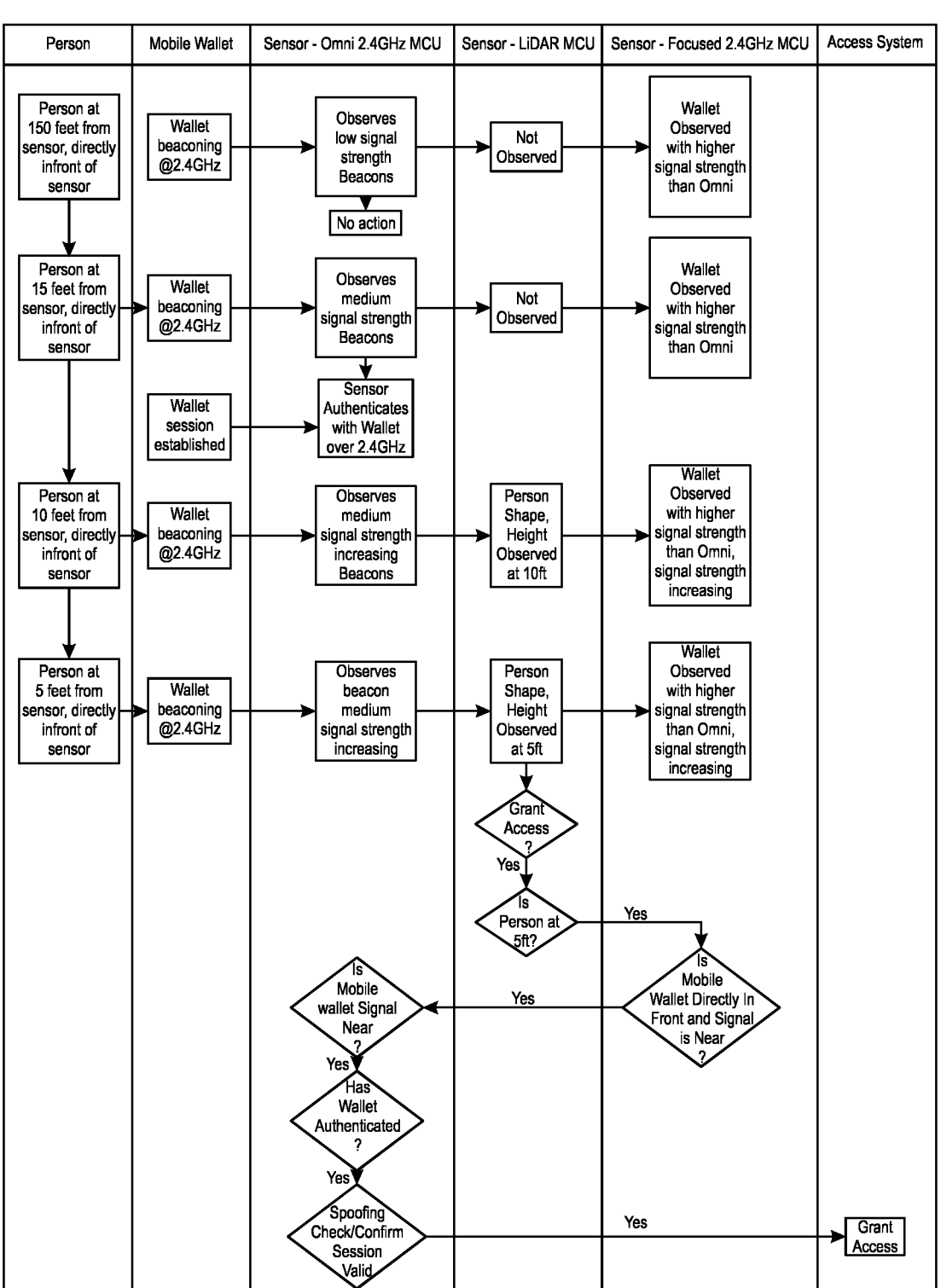
FIG. 1 is a flowchart describing the present invention.
Figure 2:
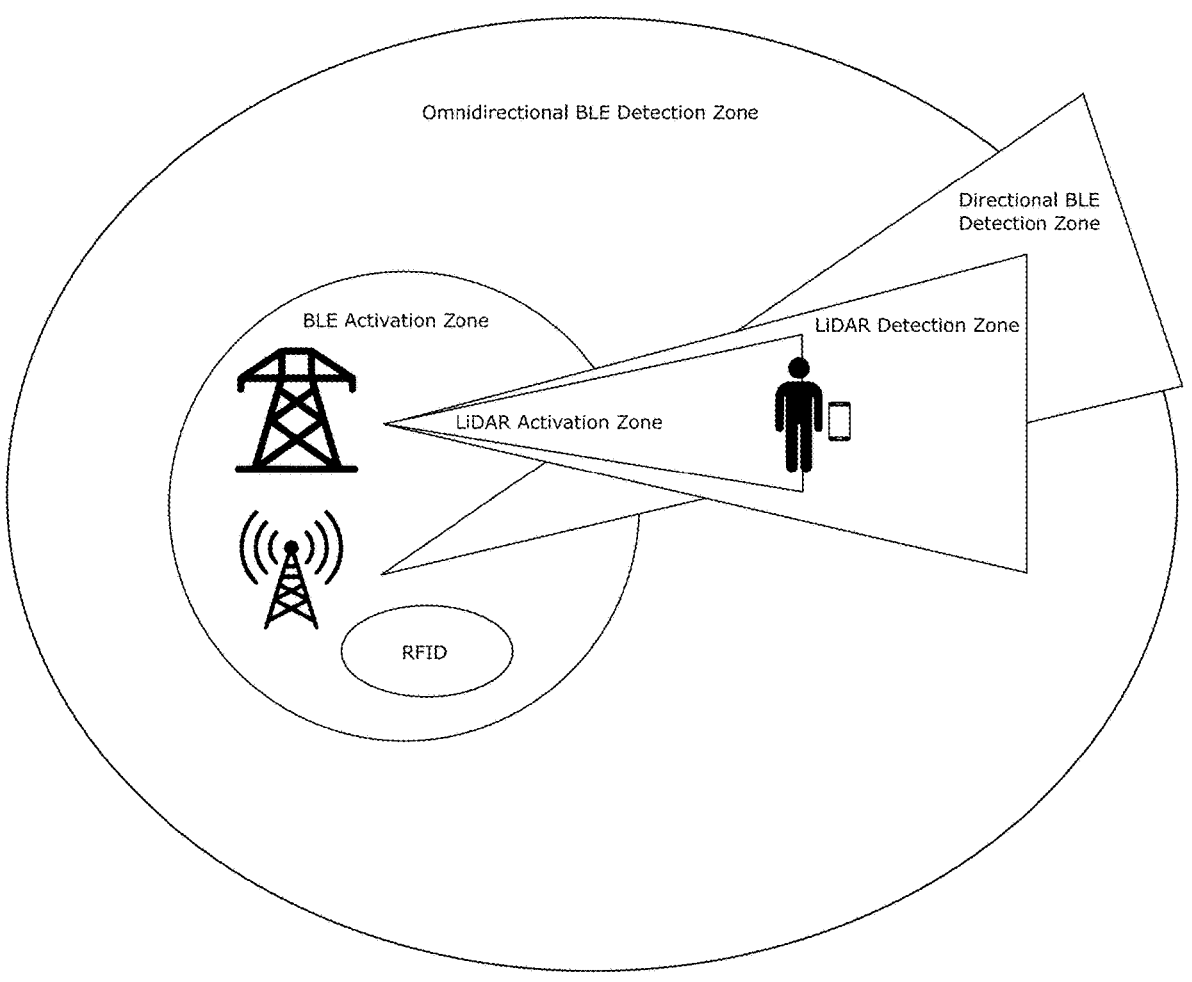
FIG. 2 is an illustration of the present invention.
Figure 3:
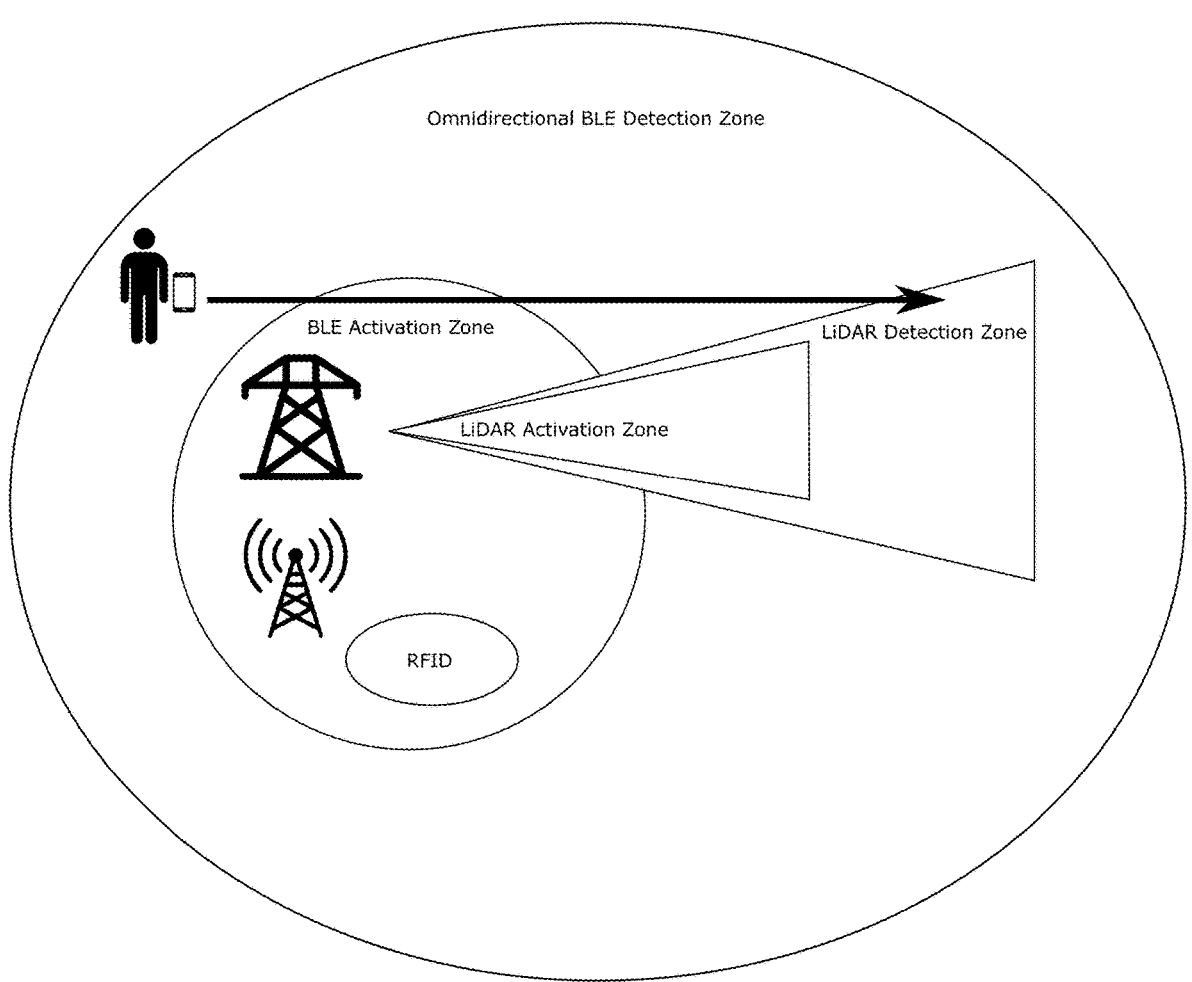
FIG. 3 is an illustration of the present invention including a user behind the sensor device.
Figure 4:
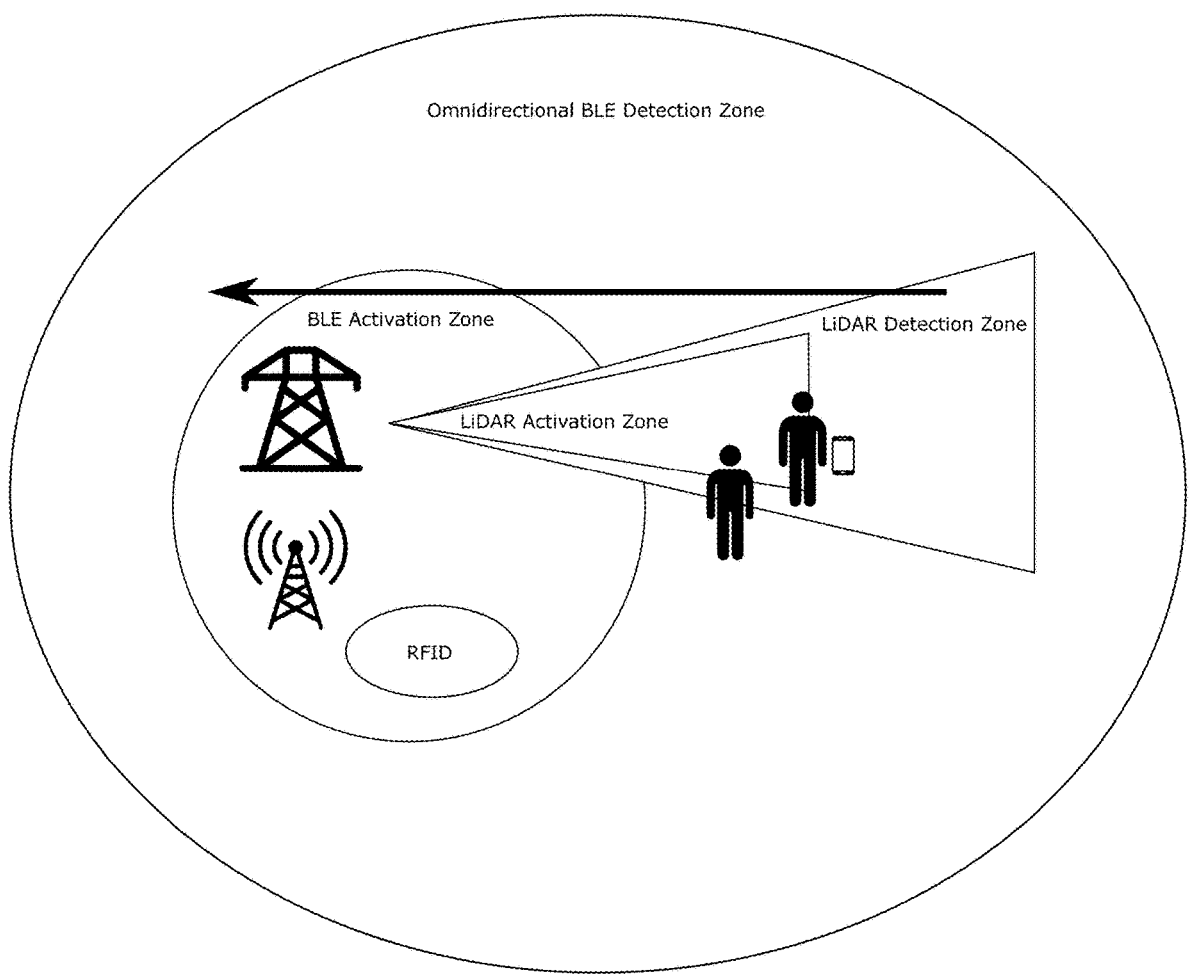
FIG. 4 is an illustration of the present invention including multiple users in front of the sensor device.
Figure 5:
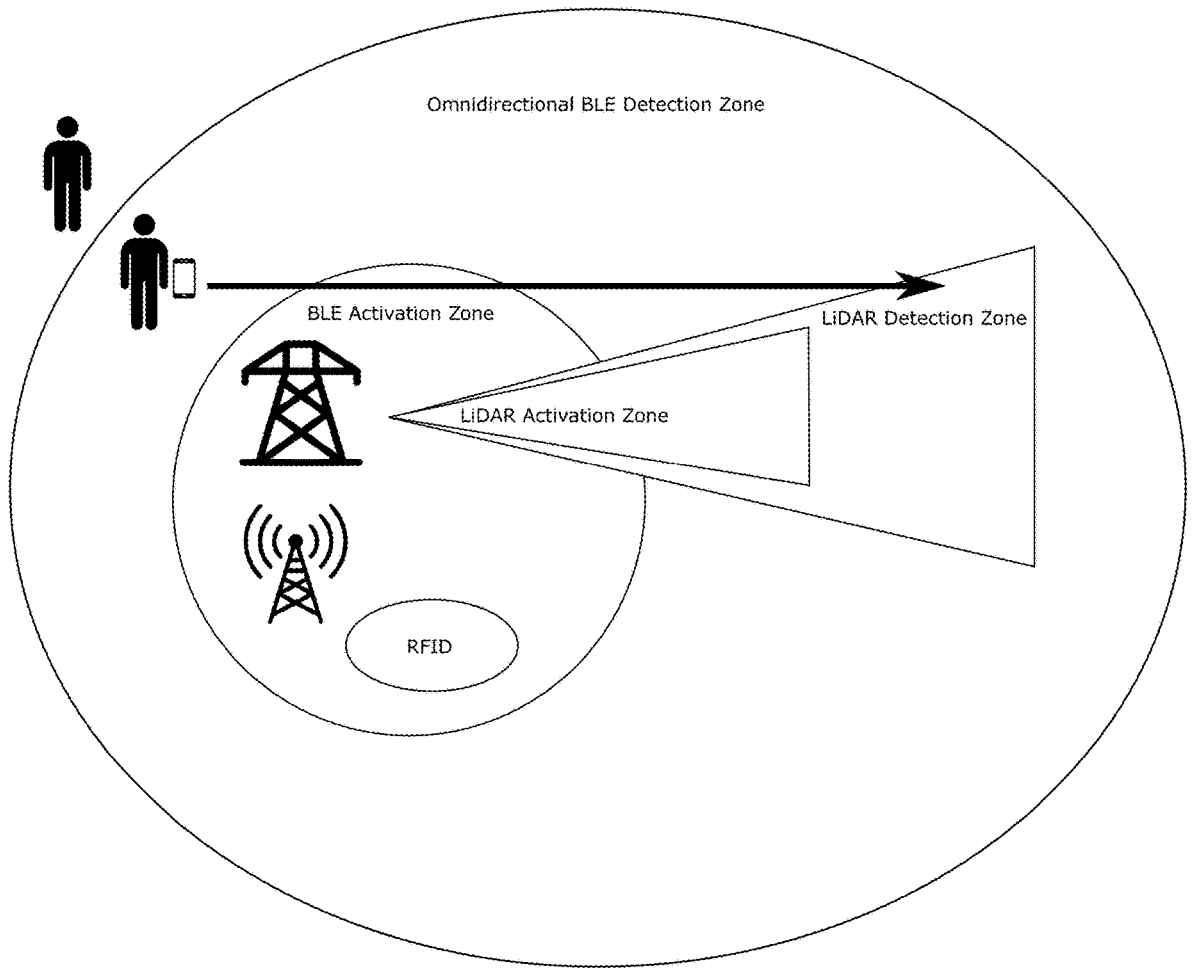
FIG. 5 is an illustration of the present invention including multiple users behind the sensor device.
Figure 6:
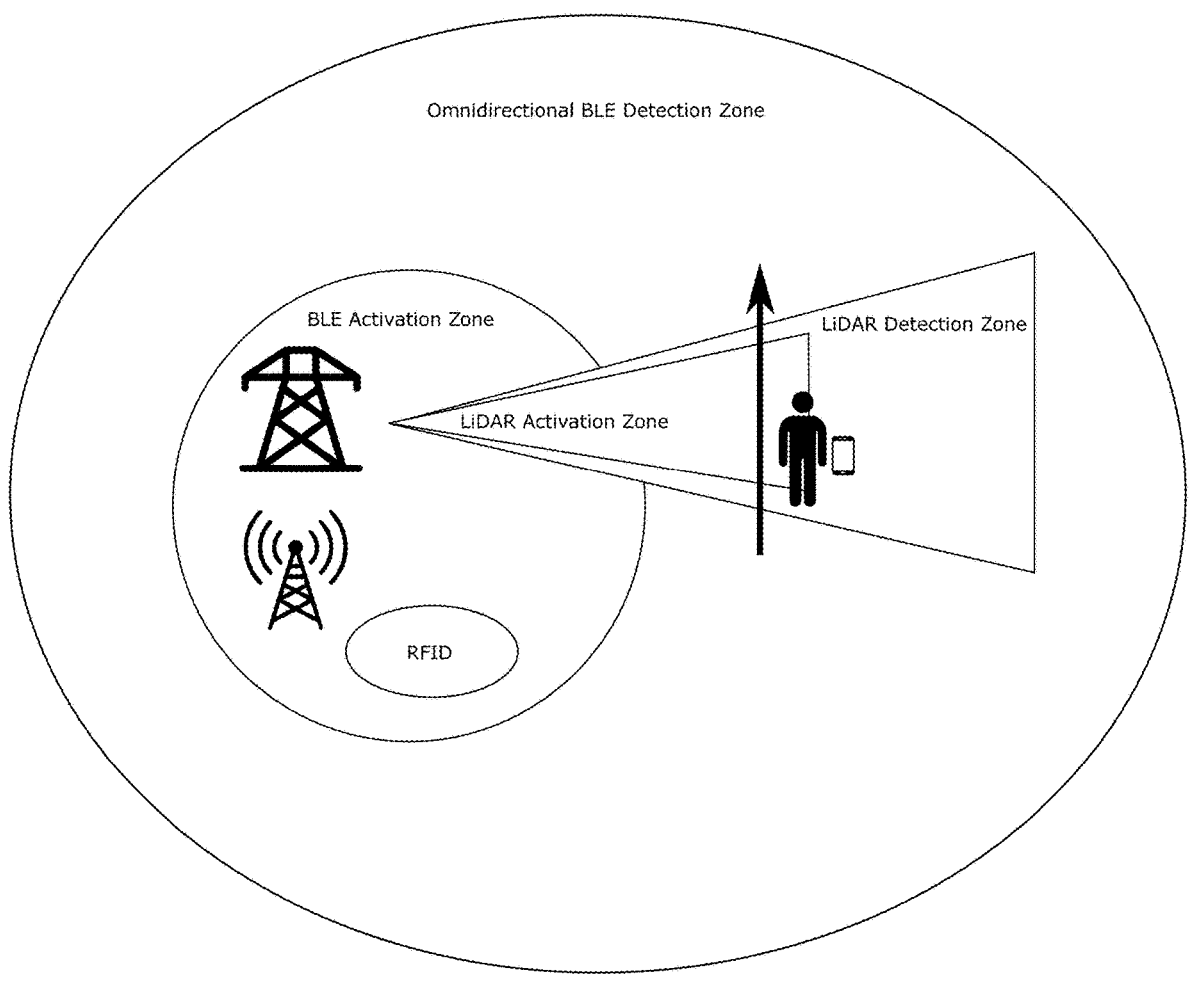
FIG. 6 is an illustration of the present invention including the directionality of the user in front of the sensor device.
Figure 7:
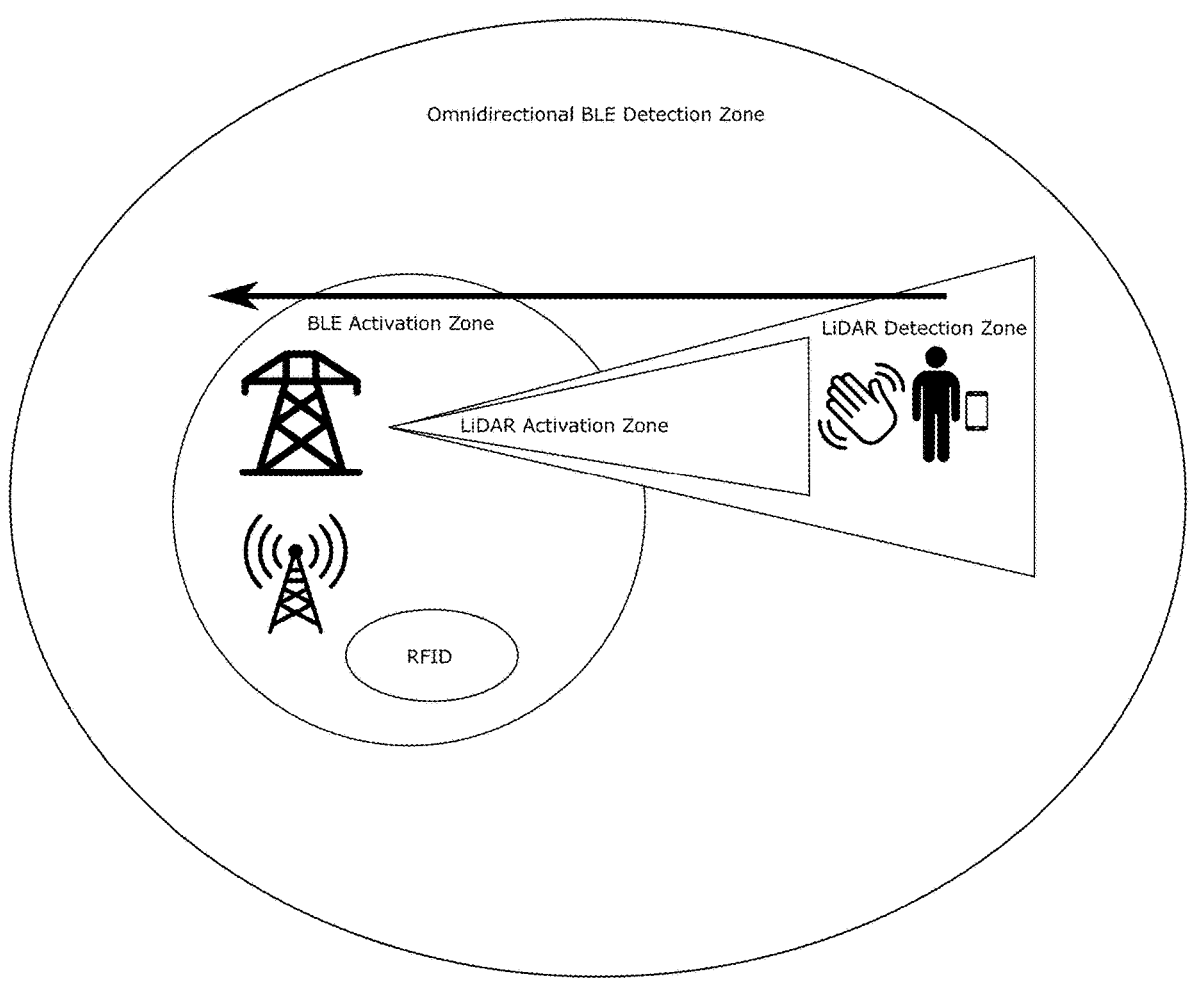
FIG. 7 is an illustration of the present invention including specific large motion gestures such as waving of a hand.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header. All illustrations of the drawings are for the purpose of describing selected versions of the present invention and are not intended to limit the scope of the present invention.

The present disclosure includes many aspects and features. Moreover, while many aspects and features relate to, and are described in the context of the disclosed use cases, embodiments of the present disclosure are not limited to use only in this context.

In the present disclosure, a "mobile handset" may be a mobile phone, an electronic badge, or other device capable of transmitting authenticating credential information used for authentication to buildings, resources, enterprise systems, and other secured points of access. Accordingly, a "mobile wallet" is a software wallet that exists on a mobile handset where the mobile wallet contains one or more virtual credentials or electronic badges.

As described in FIG. 1-10, the present invention is a low power replacement sensor device for legacy RFID door readers comprising an omnidirectional BLE radio antenna; a unidirectional BLE radio antenna; a forward-facing LiDAR sensor; support for reading legacy RFID technology, newer advanced RFID technology, and other mobile credentials; and the use of low voltage legacy access control power systems. The preferred embodiment of the present invention further comprises an optical camera and a radar.

The preferred embodiment of the present invention comprises the combination of an omnidirectional BLE radio antenna, a unidirectional BLE radio antenna, a forward-facing LiDAR sensor, and an optical camera. The combination of each of these sensors allows the device to accurately determine a person's intention to authenticate to a door or computer merely by their physical action of approaching a door or computer.

Said omnidirectional BLE radio antenna detects the BLE radio transmissions created by the mobile handset wallet software, the mobile handset operating system, or other authenticating digital credential. An omnidirectional BLE radio antenna alone cannot determine the distance or direction of the mobile handset whether the mobile handset is in front, behind, above, or below the sensor device, or the directionality of the mobile handset e.g. left to right, or right to left. Instead, an omnidirectional BLE radio alone can only determine whether the mobile handset is within three states: close, near, or far.

Said unidirectional BLE radio antenna can determine if the mobile handset is in front of said sensor device. By combining said unidirectional BLE radio antenna with said omnidirectional BLE radio antenna, said sensor device can determine whether the mobile handset is close, near, or far and whether the mobile handset is in front of the sensor device or not.

Said forward-facing LiDAR can accurately measure the number and the distance of fixed and moving objects in front of the sensor device. The sensor uses a LiDAR with 64 measure points across a 90 degree field of view. These 64 points are in effect the resolution of the LiDAR sensor. By combing the forward-facing LiDAR with the omnidirectional BLE radio antenna and the unidirectional BLE radio antenna shown in FIG. 2-7, the sensor device can determine: how far away an object is with millimeter accuracy up to 4 meters away; how many objects are in front of the sensor device; the directionality of those objects; the relative height and width of the object as a function of distance to the resolution of the LiDAR; specific large motion gestures such as holding a hand out, waving of a hand, etc., as particularly shown in FIG. 7; and depth of contours of specific objects limited to the resolution of the object within partial or total field of view. As particularly shown in FIGS. 9 and 10, said forward-facing LiDAR determines a rough 3D "fingerprint" of an approaching person. The mobile handset in possession of the person provides said sensor device with a LiDAR template of the mobile handset's owner. This template allows said sensor device to further discern and differentiate between holders of mobile handset credentials. By using a LiDAR template, said sensor device can differentiate between a person's height, size, and facial features. Said forward-facing LiDAR begins to process measurement data at approximately 8 ft away from said sensor device when a person is in full view of said sensor device and continues to track and measure as the person approaches. In addition to detection of objects and persons, said forward-facing LiDAR may be used to map 3D features to millimeter accuracy of a target, further enhancing the level of identification to full biometric authentication to the particular mobile handset. This level of precision allows for the discerning of the person with the correct corresponding mobile handset and provides a strong second factor of authentication and future reauthentication. Said forward-facing LiDAR has a resolution which allows for hundreds of measurements across a person's body to develop a contour of the person's features. Advantageously, storing of LiDAR templates within the mobile wallet or mobile handset eliminates the need for said sensor device to store or retain the LiDAR template locally. This combination further creates an opportunity for biometric confirmation. The preferred embodiment of the present invention uses a slow scanning, low energy LiDAR to pulse at periodic intervals to determine if any object has moved within a configurable distance of the sensor device, up to 8 m, and to power up the RFID magnetic field. In the preferred embodiment of the present invention, the pulsing interval can be as infrequent as once per second. When an object is detected within range, the sampling by the device's computer vision system is increased to determine direction. If a person is moving towards the sensor device and reaches less than a configurable distance, e.g. 3 ft, the RFID magnetic field can be fully powered until the person is no longer present. If the present invention's input power is less than required to operate the computer vision processing system, the present invention may advantageously reduce the functionality of the optical camera and transfer the computer vision imaging to an external system, such as a cloud host computer for processing.

Said output logic combines detections from said omnidirectional BLE radio antenna, said unidirectional BLE radio antenna, and said forward-facing LiDAR to determine if an authenticating mobile handset is near said sensor device, if an authenticating mobile handset is in front of said sensor device, and if an authenticating mobile handset is in possession of a user that intends to access beyond said sensor device. Said sensor device uses said omnidirectional BLE radio antenna and said unidirectional BLE radio antenna to determine if a nearby mobile handset is authenticating. Said forward-facing LiDAR further determines if the nearby authenticating mobile handset is in possession of a user that intends to access beyond said sensor device and not otherwise in possession of a user nearby that does not intend to access beyond said sensor device. The combination of these components controlled by said output logic allows said sensor device to prevent access to intruders who may be attempting to gain access beyond said sensor device through authentication of another user nearby.

The preferred embodiment of the present invention further comprises an optical camera. Said optical camera may be triggered at the correct distance to capture an image of the person as they approach and depart from a doorway. The combination of the LiDAR and said optical camera enables the sensor device to limit its recording of images to only potentially useful frames where the person may be fully seen. This combination further creates an opportunity for biometric confirmation. In the preferred embodiment of the present invention, said optical camera operates using legacy wiring for power and WiFi for high speed data transfer.

The preferred embodiment of the present invention further comprises a radar. Across different lighting conditions, LiDAR exhibits limited effective range. Under ideal conditions, LiDAR provides reliable detection between 5-8 ft. Under direct sunlight and under store lighting, the effective range of LiDAR detection is between 1-4 ft. Other factors of obfuscation, including rainfall and condensation, further affects the effective range of accurate, reliable detection. To compensate for the weaknesses of LiDAR, implementing radar provides reliable detection at longer ranges. In contrast to LiDAR, radar can suffer from poor accuracy and performance at short distances within a few feet of a sensor. Therefore, a combination of LiDAR, radar, and the BLE radio antenna array provides the optimal end user experience. Radar accurately determines people between 4-30 ft and can determine the number of people within that range. LiDAR confirms the intention of the person to enter through a door under 4 feet. Finally, the BLE radio antenna array can confirm if the target phone or device is indeed within the desired frontal location of the sensor.

Figure 8:
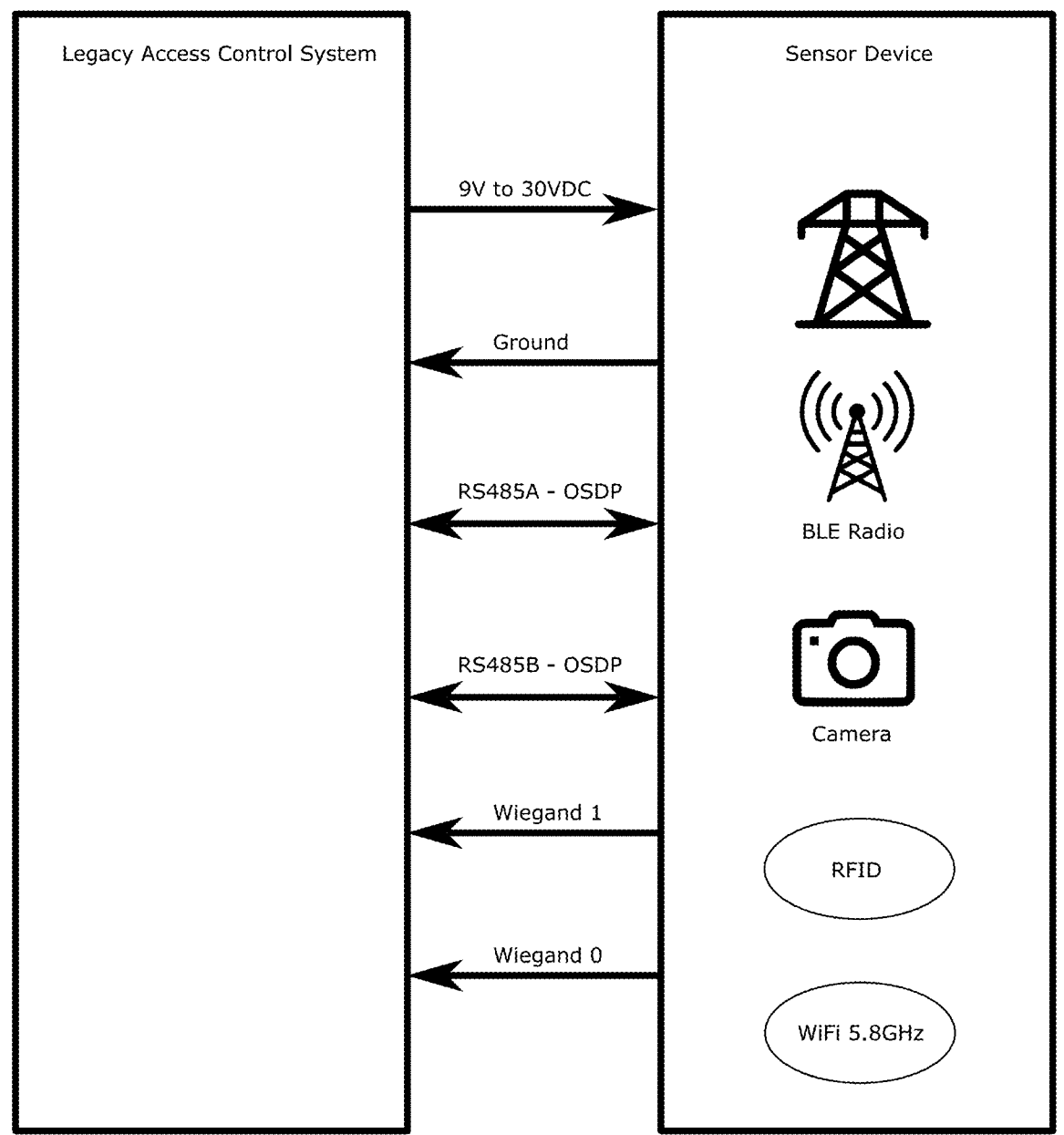
FIG. 8 is an illustration of the present invention describing the low power connections between legacy access control systems and the sensor device of the present invention.
Figure 9:
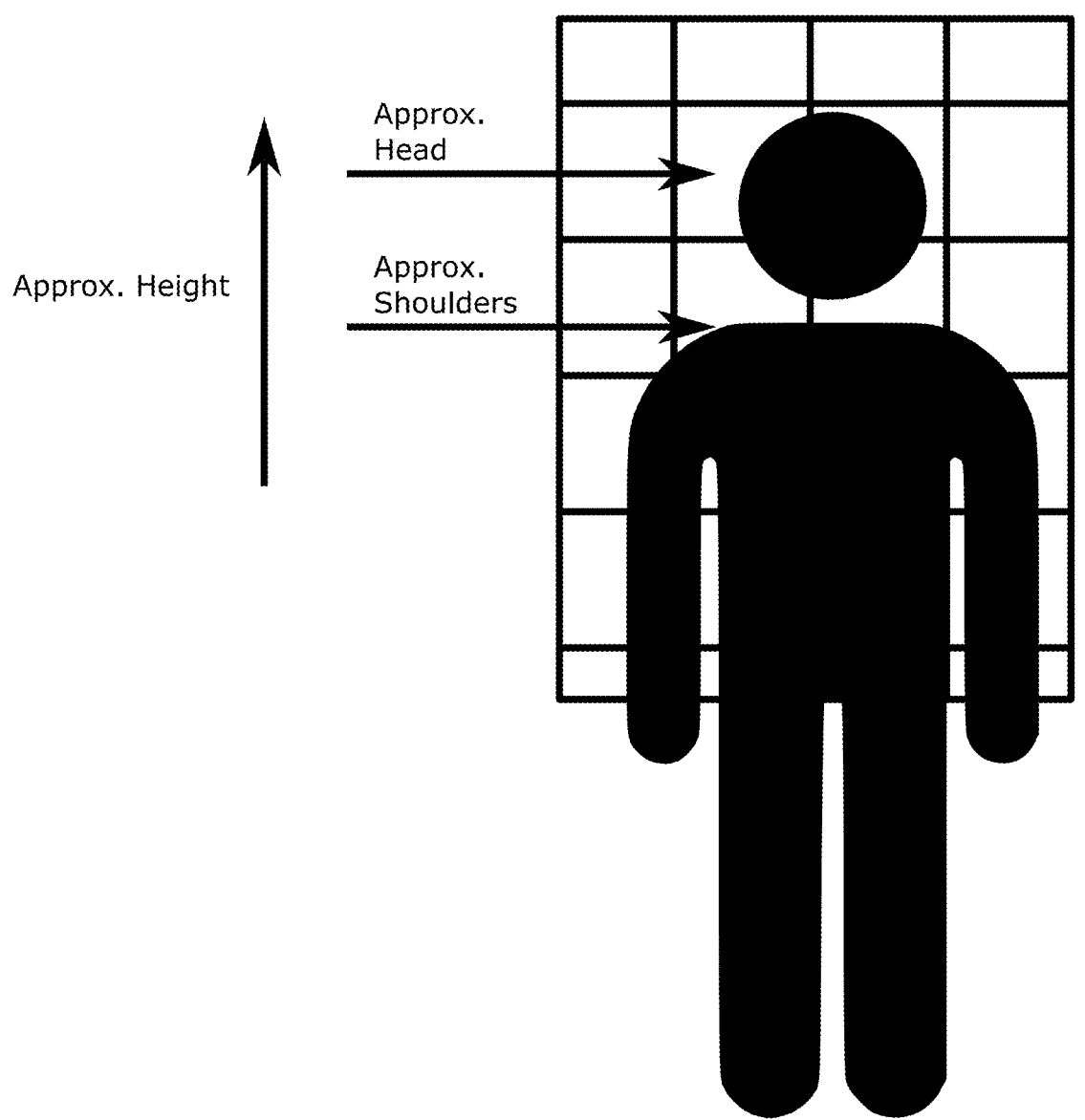
FIG. 9 is an illustration of the present invention including the forward-facing LiDAR measuring the approximate head, shoulders, and height of an approaching person.
Figure 10:
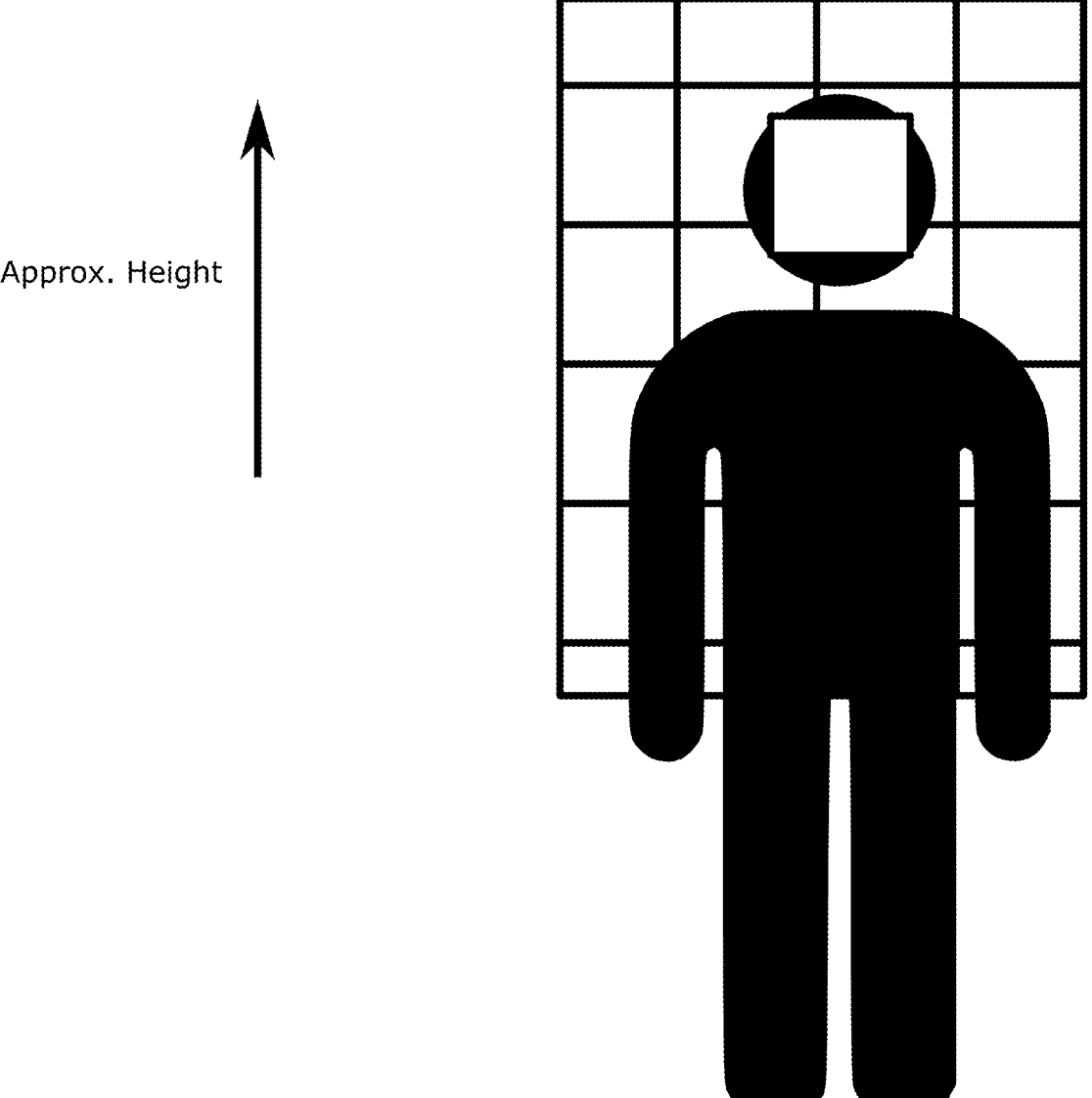
FIG. 10 is an illustration of the present invention including the forward-facing LiDAR discerning the facial features of an approaching person.

The present invention is able to operate using low power legacy wiring infrastructure because the present invention advantageously maintains a low power of operation by not using its optical sensor or computing vision at all times. The present invention therefore allows more users to utilize the benefits of sophisticated RFID technology without incurring the cost of replacing commonly installed wiring infrastructure. Referring to FIG. 8, the sensor device may utilize existing wiring infrastructure for power requirements. Another embodiment of the present invention utilizes low energy Wiegand power.

The preferred embodiment of the presentation comprises a WiFi 5.8 GHz communication interface. The WiFi interface is used for high speed data transfer from the sensor device. Because low power wiring is not optimally used for data transfer, WiFi used for data transfer complements the present invention's use of legacy wiring for power.

Another embodiment of the present invention further comprises a rechargeable power reserve that trickle charges between use. In this embodiment, the power stored in the power reserve is made available to the device during high power operations such as computer vision calculations.

Other embodiments of the present invention further comprise an LTE modem. Said LTE modem further contributes to the transmission of data through a wireless communication network. In the preferred embodiment of the present invention, the present invention may permissively use LTE for data transfer in addition to WiFi or other means of data transfer.

Other embodiments of the present invention further comprise an RFID reader. In the preferred embodiment of the present invention, said RFID reader is a 13.56 Mhz RFID reader capable of authenticating a mobile handset with RFID credentials.

Although the invention has been explained in relation to its preferred embodiment, it is to be understood that many other possible modifications and variations can be made without departing from the spirit and scope of the invention.

What is claimed is:

1. A sensor device comprising:
a unidirectional BLE radio antenna;
a forward-facing LiDAR;
output logic to instruct access or to control local access to a resource;
an LTE modem;
wherein said unidirectional BLE radio antenna can detect whether a mobile handset or other authenticating digital credential is in front of said sensor device;
wherein said forward-facing LiDAR can detect the number and distance of fixed and moving objects in front of said sensor device; and
wherein said output logic combines detection data from said unidirectional BLE radio antenna, and said forward-facing LiDAR to authenticate a mobile handset or other authenticating digital credential.

2. The device of claim 1, further comprising:
an omnidirectional BLE radio antenna;
wherein said omnidirectional BLE radio antenna can detect the distance of a mobile handset or other authenticating digital credential; and
wherein said output logic further combines detection data from said omnidirectional BLE radio antenna to authenticate a mobile handset or other authenticating digital credential.

3. The device of claim 1, further comprising:
a 13.56 Mhz RFID reader.

4. The device of claim 1, further comprising:
an optical camera.

5. The device of claim 1, further comprising:
a radar.

6. The device of claim 1:
wherein said forward-facing LiDAR can detect the intent to authenticate a mobile handset or other authenticating digital credential.

7. The device of claim 6:
wherein physical gestures or motions can be used to indicate intent to authenticate a mobile handset or other authenticating digital credential.

8. The device of claim 1:
wherein said forward-facing LiDAR does not automatically authentication a mobile handset or other authenticating digital credential if more than one mobile handset or other authenticating digital credential is detected.

9. The device of claim 1:
wherein said forward-facing LiDAR verifies LiDAR templates of users before authenticating a mobile handset or other authenticating digital credential.

10. The device of claim 1:
wherein said sensor device obtains power from a legacy 12V or 24V access control wiring system;
wherein said sensor device requires less than 12V 250 mA power to operate; and
wherein said sensor device can be installed without replacing legacy wiring infrastructure.

11. The device of claim 1, further comprising:
a WiFi 5.8 GHz communication interface used for high speed data transfer.

12. A sensor device comprising:
an omnidirectional BLE radio antenna;
a unidirectional BLE radio antenna;
a forward-facing LiDAR;
output logic to instruct access or to control local access to a resource;
wherein said omnidirectional BLE radio antenna can detect the distance of a mobile handset or other authenticating digital credential;
wherein said unidirectional BLE radio antenna can detect whether a mobile handset or other authenticating digital credential is in front of said sensor device;
wherein said forward-facing LiDAR can detect the number and distance of fixed and moving objects in front of said sensor device;
wherein said output logic combines detection data from said omnidirectional BLE radio antenna, said unidirectional BLE radio antenna, and said forward-facing LiDAR to authenticate a mobile handset or other authenticating digital credential;
wherein said sensor device obtains power from a legacy 12V or 24V access control wiring system;
wherein said sensor device requires less than 12V 250 mA power to operate; and
wherein said sensor device can be installed without replacing legacy wiring infrastructure.

13. The device of claim 12, further comprising:
an LTE modem.

14. The device of claim 12, further comprising:
a 13.56 Mhz RFID reader.

15. The device of claim 12, further comprising:
an optical camera.

16. The device of claim 12, further comprising:
a radar.

17. The device of claim 12:
wherein said forward-facing LiDAR can detect the intent to authenticate a mobile handset or other authenticating digital credential;
wherein physical gestures or motions can be used to indicate intent to authenticate a mobile handset or other authenticating digital credential;
wherein said forward-facing LiDAR does not automatically authentication a mobile handset or other authenticating digital credential if more than one mobile handset or other authenticating digital credential is detected; and
wherein said forward-facing LiDAR verifies LiDAR templates of users before authenticating a mobile handset or other authenticating digital credential.

18. The device of claim 12, further comprising:
a WiFi 5.8 GHz communication interface used for high speed data transfer.

19. A sensor device comprising:
an omnidirectional BLE radio antenna;
a unidirectional BLE radio antenna;
a forward-facing LiDAR;
an LTE modem;
a 13.56 Mhz RFID reader;
an optical camera;
a radar;
a WiFi 5.8 GHz communication interface used for high speed data transfer;
output logic to instruct access or to control local access to a resource;
wherein said omnidirectional BLE radio antenna can detect the distance of a mobile handset or other authenticating digital credential;

wherein said unidirectional BLE radio antenna can detect whether a mobile handset or other authenticating digital credential is in front of said sensor device;

wherein said forward-facing LiDAR can detect the number and distance of fixed and moving objects in front of said sensor device;

wherein said output logic combines detection data from said omnidirectional BLE radio antenna, said unidirectional BLE radio antenna, and said forward-facing LiDAR to authenticate a mobile handset or other authenticating digital credential;

wherein said sensor device obtains power from a legacy 12V or 24V access control wiring system;

wherein said sensor device requires less than 12V 250 mA power to operate;

wherein said sensor device can be installed without replacing legacy wiring infrastructure;

wherein said forward-facing LiDAR can detect the intent to authenticate a mobile handset or other authenticating digital credential;

wherein physical gestures or motions can be used to indicate intent to authenticate a mobile handset or other authenticating digital credential;

wherein said forward-facing LiDAR does not automatically authentication a mobile handset or other authenticating digital credential if more than one mobile handset or other authenticating digital credential is detected; and wherein said forward-facing LiDAR verifies LiDAR templates of users before authenticating a mobile handset or other authenticating digital credential.

\* \* \* \* \*